US008239253B2

(12) United States Patent
Wu

(10) Patent No.: US 8,239,253 B2
(45) Date of Patent: Aug. 7, 2012

(54) ELECTION-BASED ELECTRONIC COMPILATIONS

(76) Inventor: Louis L. Wu, Piedmont, CA (US)

( * ) Notice: Subject to any disclaimer, the term of this patent is extended or adjusted under 35 U.S.C. 154(b) by 1242 days.

(21) Appl. No.: 11/781,693

(22) Filed: Jul. 23, 2007

(65) Prior Publication Data

US 2008/0027792 A1 Jan. 31, 2008

Related U.S. Application Data

(60) Provisional application No. 60/820,435, filed on Jul. 26, 2006, provisional application No. 60/823,643, filed on Aug. 26, 2006, provisional application No. 60/882,352, filed on Dec. 28, 2006.

(51) Int. Cl.
*G06F 11/00* (2006.01)

(52) U.S. Cl. .......................................................... 705/12

(58) Field of Classification Search ..................... 705/12
See application file for complete search history.

(56) References Cited

U.S. PATENT DOCUMENTS

| | | | | |
|---|---|---|---|---|
| 5,671,428 | A | 9/1997 | Muranaga et al. | |
| 5,978,798 | A | 11/1999 | Pozbabski et al. | |
| 6,285,999 | B1 | 9/2001 | Page | |
| 6,662,998 | B2 * | 12/2003 | McClure et al. | 235/51 |
| 7,603,626 | B2 * | 10/2009 | Williams et al. | 715/751 |
| 2002/0029163 | A1 | 3/2002 | Joao | |
| 2002/0038236 | A1 * | 3/2002 | Schechter et al. | 705/12 |
| 2002/0049738 | A1 | 4/2002 | Epstein | |
| 2002/0152379 | A1 * | 10/2002 | Gefwert et al. | 713/168 |
| 2003/0060910 | A1 | 3/2003 | Williams et al. | |
| 2003/0149616 | A1 | 8/2003 | Travailles | |
| 2003/0173404 | A1 * | 9/2003 | Chung et al. | 235/386 |
| 2005/0086222 | A1 | 4/2005 | Wang et al. | |
| 2005/0263594 | A1 * | 12/2005 | Onischu | 235/386 |
| 2005/0284936 | A1 | 12/2005 | Pazniokas et al. | |
| 2006/0031214 | A1 | 2/2006 | Solaro et al. | |
| 2006/0122859 | A1 | 6/2006 | Feldman et al. | |
| 2007/0083423 | A1 * | 4/2007 | Delbridge | 705/12 |
| 2007/0121843 | A1 * | 5/2007 | Atazky et al. | 379/114.13 |

OTHER PUBLICATIONS

The Charleston Gazette. Charleston, W.V.: Feb 8, 2006. p. 1, New machines to change Putnam voting procedures.*
International Search Report and Written Opinion for PCT/US2007/74251, Jan. 29, 2008, 7 pages.

* cited by examiner

*Primary Examiner* — Romain Jeanty
*Assistant Examiner* — Luis Santiago

(57) ABSTRACT

Electronically published compilations are provided. The compilations typically include a plurality of incumbent entries that are subject to replacement by candidate revisions through successive elections by an electorate of voters, e.g., human voters. Also provided are methods for improving existing compilations through elections. Election rules, history, dates and times, and election results may provide a measure of quality of the winning revision. Such compilations, when properly designed and implemented, may be viewed as an authoritative reference work that may ultimately serve as a "Rosetta Stone" for a semantic web.

20 Claims, 1 Drawing Sheet

ELECTION-BASED ELECTRONIC COMPILATIONS

CROSS REFERENCE TO RELATED APPLICATIONS

This application claims priority to U.S. Provisional Patent Application Ser. Nos. 60/820,435, 60/823,643, and 60/882,352, filed Jul. 26, Aug. 26, and Dec. 28, 2006, respectively, each entitled "Election-Based Electronic Compilations," by Louis Wu, the disclosures of which are incorporated by reference in their entirety.

BACKGROUND OF THE INVENTION

1. Field of the Invention

The invention relates generally to a compilation of electronically published entries. More specifically, the invention relates to such a compilation whose entries are subject to successive revision as determined by elections.

2. Description of Background Art

There is a recognized need for compilations such as reference works, e.g., encyclopedias, dictionaries, thesauruses. Such works may contain entries on a wide range of subjects or on numerous aspects of a particular subject. Librarians often recommend well-written, authoritative and reliable compilations as a starting point for research.

Compilations may be written for different purposes and have differing levels of specialization. For example, general-purpose encyclopedias like Encyclopedia Britannica are sometimes considered remedial in nature. In contrast, scholarly encyclopedias may discuss the "state of research" and set forth generally accepted views about a specialized area. Furthermore, governments may author and update laws in the form of compilations, e.g., the United States Code and the United States Code of Federal Regulations.

Comprehensiveness is a desirable quality for authoritative reference works. For example, many consider the Oxford English Dictionary to be the ultimate reference work in English lexicography because it spans 20 volumes and includes extensive cross-references and word etymologies. Similarly, the reputation of a reference work's author, editor and/or publisher may also contribute to the authority of the work. For example, metallurgists often consider the ASM Handbook, by ASM International Handbook Committee, as an authoritative reference work on metals and alloys.

With the wide availability of reference works in electronic form, an unprecedented and ever-increasing wealth of information is now available to computer users via the internet Containing numerous of web sites dedicated to a wide range of topics, the internet has become an increasingly useful resource for researchers. Unfortunately, the abundance of both good and bad information, combined with the structure of the internet renders the internet itself incapable of serving as a high-quality compilation. For example, anyone with access to the internet can post web sites about topics that interest him or her. These sites are not always accurate and may not reasonably serve as an authoritative source of information.

The internet by its nature has no hierarchical structure. Most information on the internet is found using online search engines that employ indices formed by "web crawlers" that parse pages on the web, the pages to which those pages link, and so on. The indices used by search engines are typically based on words found on those pages, as well as position, prominence, frequency of user access, and other attributes. Results are typically returned in a linear list of items, based on some form of ranking. For example, the items may be presented in descending ranked order, determined based on the attributes mined regarding the usage of the word or words included in the search, the frequency of access by users, or other attributes.

A number of patents and patent applications describe automated database and search engine technologies. For example, U.S. Pat. No. 5,978,798 to Pozbabski et al. describes methods and apparatuses for accessing databases. U.S. Pat. No. 6,285,999 to Page describes a method for node ranking in a linked database. U.S. Patent Application Publication No. 20060031214 to Solaro et al. describes an adaptive categorical presentation of search results. Similarly, methods that allow for semi-automatic construction of a knowledge base of encyclopedia question answering system are discussed in U.S. Patent Application Publication No. 20050086222 to Wang et al.

The automated approach, however, has its drawbacks because it merely sorts possibly relevant information from irrelevant information. False positive results occur with high frequency. In addition, automated search approaches are not generally useful to determine whether any hit that turns up is an authoritative source.

Recently, user editable web-published compilations have gained in popularity. The Wikipedia® website at http://www.wikipedia.org contains a well-known example of a user-editable compilation based on wiki technology. Changes to the website's articles are reflected in a substantially instantaneous or real-time manner. The website describes itself as one of the most-used reference resources on the internet The Wikipedia® website has become increasingly controversial. Supporters of the website praise the website for making it possible to create or update articles quickly in response to current events. In addition, supporters assume that by exposing the articles of the website to open editing by many users will result in improved accuracy over time. In contrast, others maintain that non-expert editing undermines quality of the website, rendering the website unauthoritative and unreliable. The website has also been criticized as exhibiting severe systemic bias and inconsistency, due to the group dynamics associated with the website's users. Furthermore, the website has been challenged for its use of dubious sources, its disregard for credentials, and its vulnerability to vandalism and crackpot interest groups. In sum, supporters applaud the website for its vitality; critics dismiss the website for its vulgarity.

Public controversy arose when a then-anonymous editor planted false information in a Wikipedia® entry on John Seigenthaler Sr., a former administrative assistant and pall-bearer to Robert Kennedy to play a joke a colleague of the editor who knew the Seigenthaler family. The entry falsely suggested that, Seigenthaler had a role in the assassinations of both John F. Kennedy and Robert F. Kennedy. Ordinary Wikipedia® visitors did not immediately recognize the hoax as such, and no correction was made for over four months. Seigenthaler wrote an article describing the particulars of the incident and criticized the website for offering arguably libelous and hurtful material to a wide audience. The article also indicated that the falsehoods remained on other websites such as answers.com and reference.com for three more weeks after their removal from the Wikipedia® website.

Seigenthaler is not alone in his criticism of the Wikipedia® website. Critics of the Wikipedia® website include, for example, editors themselves, ex-editors, and subjects of articles. A website critical of the Wikipedia® website can be found at www.wikitruth.info. The wikitruth website has been a self-described "free scandal sheet that anyone can visit" that provides documentation of ongoing "atrocities" published on the Wikipedia® website. FIG. 2 shows a banner that provides a tongue-in-cheek criticism of the Wikipedia® website. Another critical website as of Jul. 17, 2006 can be found at www.wikipedia-watch.org. As a result, many librarians, academics and editors consider the Wikipedia® website as having no or limited utility as a reference work.

Another problem associated with the Wikipedia® website, according to its critics, is that it is a work overseen by an oligarchy composed of its "cult" of administrators, stewards, and bureaucrats. For example, the website indicates that its maintenance tasks are performed by a hierarchical governing group of volunteer developers, stewards, bureaucrats, and administrators. The website is a self-described work of "consensus" rather than elections. The website also indicates that Jim Wales, a founder (or cofounder with Larry Sanger) of the website, "retains final judgment on Wikipedia policies and user guidelines." Critics have derisively referred to Wales as the "God-King Jimbo."

Wikipedia® administrators have the power to prevent articles from being edited, delete articles, or block users from editing in accordance with community "policy." Due to the open nature of the website, disputes between editors often arise. As a result, disputing editors may continually undo the changes made by each others, resulting in "edit wars." When one disputing editor is an administrator and another is not, the administrator may "win" an edit war by blocking temporarily or permanently the editor who is not an administrator from editing the website. In effect, an ordinary editor can be viewed as an inferior or "second class" Wikipedia® "citizen" relative to a Wikipedia® administrator. Unequal treatment of similarly situated human individuals violates the equal protection principles set forth in Brown v. Board of Education, 347 U.S. 483 (1954) and Reynolds v. Sims, 377 U.S. 533 (1964).

Wikipedia® users may become administrators by meeting fluctuating criterion determined by the governing group. Critics have also likened the process of becoming a Wikipedia® administrator to a "beauty contest." It is reportedly nearly impossible to remove the powers from administrators because the governing group both set and execute Wikipedia® policy and the power structure of the Wikipedia® website involves power devolved from one source, i.e., Wales, in a top-down rather than bottom-up manner. Users may be further alienated by Wikipedia® jargon or "doublespeak." As a result, users often become discouraged from making further contributions amid charges of abuse of power and lack of due process. In short, critics consider the Wikipedia® website as containing the work of a "mob" or as a "cult-of-personality" rather than containing the work of a true democracy.

Critics further charge that the Wikipedia® website now exercises an undue influence on what passes for reliable information due to the site's popularity. Search engines often rank Wikipedia® pages near the top, and the pages are often scraped to carry ads. According to www.wikipedia-watch.org, "it is primarily Google's fault" that the Wikipedia® website has turned into a massive spam and gossip generator. Further according to www.wikipedia-watch.org, "Google doesn't care; their ad money comes right off the top."

Alternative technologies involving group efforts are known as well. U.S. Patent Application Publication No. 20060122859 to Feldman et al. describes a computer-implemented method for computer supported cooperative work that involve member voting and decision making through document management. In general, elections are held to approve or disapprove of the contents of a document rather than to provide alternatives and revisions. In addition, the method suffers from many of the flaws that plague the Wikipedia® website. For example, the method requires actions to be taken by one or more "coordinators" with powers similar to those possessed by Wikipedia® administrators. The coordinator can arbitrarily and capriciously approve membership, determine whether any submitted document is subject to voting, change the configuration of the system at any time in an instantaneously effective manner, disregard the outcome of a vote, etc. Accordingly, the method may be characterized as an invitation for abuse of power. Additional collaborative writing technologies are described in U.S. Patent Application Publication No. 20030060910 to Williams et al. and U.S. Pat. No. 5,671,428 to Muranaga et al. None of these patents and publications satisfactorily addresses all the problems discussed above.

Thus, opportunities exist to overcome the drawbacks as discussed above and to provide alternatives and improvements to known electronic compilation technologies to enhance comprehensiveness and reliability of compilations such as authoritative references works.

SUMMARY OF THE INVENTION

In a first embodiment, the invention provides an electronic compilation of published entries. The compilation includes a plurality of electronically published incumbent entries, wherein each entry is subject to successive replacement as determined by successive elections. The elections are held at a predetermined frequency. The compilation also include a means for receiving at least one candidate electronic revision for each entry, a means for putting forth any candidate revisions received for electronic voting during a predetermined voting period, a means for counting electronic votes cast during the predetermined voting period, and a means for electronically replacing any losing incumbent entry with a winning candidate revision according to a count of the votes cast and a predetermined winning criterion.

In another embodiment, the invention provides a method for altering a compilation of preexisting electronically published entries that may be used to improve the quality of the compilation. The method involves subjecting each entry of the compilation to replacement by successive revisions as determined by successive elections by an electorate of voters having access to predetermined election rules and at a predetermined election frequency. Each entry is replaced when a candidate revision wins an election according to a count of votes cast and a predetermined winning criterion. The predetermined election frequency is selected to allow the electorate sufficient time to have an opportunity to review the incumbent entry, any submitted candidate entry and election rules before voting.

In yet another embodiment, the invention provides an electronic compilation of published entries prepared by the method described above. For example, the compilation may include a plurality of electronically published entries, wherein each entry is prepared by subjecting an entry to replacement by successive revisions as determined by successive elections by an electorate of voters having access to predetermined election rules and at a predetermined election frequency.

In a further embodiment, the invention provides a method for making a copy of at least a substantial portion of a compilation that includes a plurality of entries. Typically, each entry is generated from a cooperative effort of a plurality of users. In some instances, each entry is subject to replacement as determined by successive elections by an electorate of voters having access to predetermined election rules and at a predetermined election frequency. The method involves accessing the compilation and copying at least a substantial portion thereof, thereby making the copy. Such copying may involve, for example, reproducing, adapting, distributing, performing, and/or publicly displaying at least a substantial portion of the entries. As a result, the copy exhibits substantial similarity with the portion reproduced, adapted, distributed, performed, and/or publicly displayed.

In still another embodiment, the invention provides electronic copies and/or adaptations that embody works, e.g., derivative works, based on information, e.g., election history and/or vote counts, from the above methods and/or compilations. Such copies may include an electronic system and/or a computer program that uses information from any of the above methods and/or compilations as a reference against data is compared and/or evaluated. For example, the computer program may serve as a search engine that ranks websites using information, e.g., quantitative voting data, from the any of the methods and/or compilations described herein. Rankings may be based on how well site content comports with compilation content.

In yet another embodiment, the invention includes a method in which such compilations are accessed by a participant who acts in a manner that contradicts election rules.

In a yet further embodiment, the invention provides a method for rewarding a submitter of an entry for an election by an electorate of voters. The method involves rewarding the submitter in a quantifiable manner a reward proportional to votes cast in the election, e.g., all votes cast for the entry submitted by the submitter.

Other embodiments of the invention will be apparent to those of ordinary skill in the art in view of the disclosure contained herein.

DETAILED DESCRIPTION OF THE INVENTION

Definitions and Overview

Figure 1:
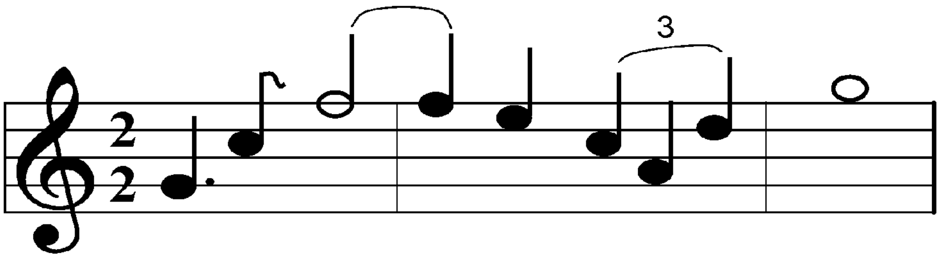
FIG. 1 is a suggested trumpet reveille calling for the advancement of collective human knowledge.
Figure 2:
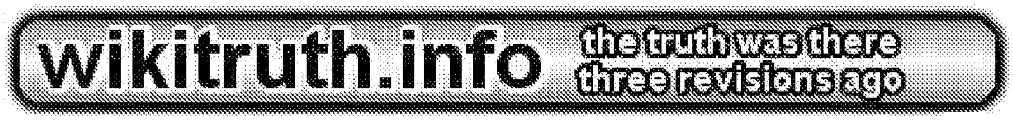
FIG. 2 is a banner found on http://wikitruth.info on Jul. 18, 2006 that serves as a tongue-in-cheek criticism of materials appearing on the Wikipedia® website.

Before describing the invention in detail, it is to be understood that the invention is not generally limited to specific electronic formats or types of platforms, as such may vary. It is also to be understood that the terminology used herein is intended to describe particular embodiments only, and is not intended to be limiting.

Furthermore, as used in this specification and the appended claims, the singular article forms "a," "an," and "the" include both singular and plural referents unless the context clearly dictates otherwise. Thus, for example, reference to "an entry" includes a plurality of entries as well as a single entry, reference to "a revision" includes a single revision as well as a collection of revisions, and the like.

In this specification and in the claims that follow, reference is made to a number of terms that are defined to have the following meanings, unless the context in which they are employed clearly indicates otherwise:

The term "audience" as in "the compilation is published to an audience" is used herein in its ordinary sense, and refers to the readers, viewers, listeners, visitors, and the like of the compilation.

The term "compilation" refers a work formed by the collection and assembling of materials or of data that are selected, coordinated, or arranged in such a way that the resulting work as a whole constitutes an original work. The term "compilation" includes "collective work," which refers to a work in which a number of contributions, constituting separate and independent works in themselves, are assembled into a collective whole.

The terms "electronic," "electronically," and the like are used in their ordinary sense and relate to structures, e.g., semiconductor microstructures, that provide controlled conduction of electrons or other charge carriers. For example, the term "electronic votes" may refer to a formal expression of preference for a proposed resolution of an issue that involves controlled conduction of electrons in a digital and/or analog manner.

The term "entry" is used herein generally in its ordinary sense and refers to the inclusion or insertion of an item, as in a record or a work that forms a portion of a compilation. Unless the context of usage clearly indicates to the contrary, the term "entry" also includes "revision," e.g., an improved or up-to-date entry.

The term "frequency" is used herein in its ordinary sense and refers to the number of occurrences within a given time period. The term "frequency" does not necessarily imply regular occurrences within the given time period. For example, the term "election frequency" refers to the number of occurrences of elections held within a given time period, regardless whether the elections occur at constant or variable intervals.

The term "internet" is used herein in its ordinary sense and refers to an interconnected system of networks that connects computers around the world via the TCP/IP and/or other protocols. Unless the context of its usage clearly indicates otherwise, the term "web" is generally used in a synonymous manner with the term "internet."

The term "substantially instantaneous" is used to refer to one or more events that to a considerable degree occur or are completed with no delay, but that the absolute absence of any delay is not required. The terms "substantial" and "substantially" are used analogously in other contexts involve an analogous definition.

In general, the invention relates to electronic compilations of published entries and updates thereto through successive elections under predetermined election rules that comport with the principles of due process and equal protection and that measure up to traditional notions fair play and substantial justice. For example, a compilation of electronically published entries may be provided comprising electronically published incumbent entries, wherein each entry is subject to replacement as determined by successive elections held at a predetermined frequency. The compilation may also include a means for receiving at least one candidate electronic revision for each entry, a means for putting forth any candidate revisions received for electronic voting during a predetermined voting period, a means for counting electronic votes cast during the predetermined voting period, and a means for electronically replacing any losing incumbent entry with a winning candidate revision according to the votes cast by an electorate of voters and a predetermined winning criterion. Such means may include hardware, firmware and/or software, e.g., web-based technology. Once a winning candidate revision takes the place of a losing incumbent entry, the winning candidate revision becomes a new incumbent entry and may be subject to successive revisions as well.

The invention may take different forms. For example, a compilation may be provided in the form of an electronic system, a data structure, an encyclopedia, a dictionary, a thesaurus or a combination thereof. In addition, the compilation may be published in whole or in part to an audience that includes the electorate and optionally others.

A number of optional features may serve to improve the quality and/or reliability of the invention. For example, the predetermined election frequency may be effective to allow the electorate sufficient time to have an opportunity to review the incumbent entry, any submitted candidate entry, and election rules before voting. Either constructive or actual notice may be provided regarding election frequency for any entry. To ensure that the electorate has meaningful access to all relevant information, a means may be provided for receiving and/or publishing campaign materials pertaining to the incumbent entries and/or candidate electronic revisions. In addition, each incumbent entry may be published with information pertaining to its origin. Such election history information typically includes a tally of votes cast for and against the entry as well as the related election rules.

The novel and nonobvious aspects of the invention as well as the invention as a synergistic whole offer a number of improvements over known technologies. For example, the invention accounts for human nature by providing a way to take advantage of skills and inclinations that individuals exhibit in ordinary everyday life. Every human being is both a teacher and a student. Teaching and learning represent a source of lifelong pleasure.

In addition, the invention exploits the superior ability of humans over known artificial means to choose between alternatives that do not lend themselves to "objective" quantification. For example, an ordinary shopper looking to buy an apple from a bin of apples will typically select the good apples over bad. Even judges in prestigious sports competitions such as Olympic figure skating rely on substantially similar skills.

Elections in the context of the electronic compilations also represent a significant innovation. In general, elections allow for an orderly expression of competitive human urges, which can be harnessed to increase submitter interest and participation as well as to improve the quality of the entries and revisions submitted. In addition, because each entry may be subject to revision by substantially solely through elections instead of by the whims of an individual or the idiosyncrasies of ordinary peer review practices, the compilation may carry an authority inherent to legitimate democratic processes. Such authority has been recognized as the basis of governmental legitimacy around the world. Publication of information regarding the origins of entries in a user friendly and optionally quantitative manner provides a measure of the entries' reliability.

More generally, the invention implicitly recognizes that instantaneous/timeless nature of the internet is not always an asset for all internet applications. For example, when the election frequency is selected to allow the electorate sufficient opportunity to review the election materials, e.g., compare the incumbent entry and any submitted candidate entry before voting, voters may deliberate and act in concert rather than take uncoordinated action through impulse. While instantaneous updates may be, ordinary users of reference works may not want or require instantaneous updates at the expense of accuracy and reliability. With the invention, likelihood of vandalism is reduced, because an update may occur only through a successful election.

The invention challenges the aphorism that search-engine ranking might makes authoritative right in a cyberspace context. In addition, the invention is based on a recognition that mob rule, even by a so-called "smart mob," offends traditional notions of fair play and substantial justice and tends to get in the way of the goodwill, cohesiveness, and unity necessary for enduring collaborative human efforts. Because a means is provided that allows an electorate successive opportunities to indicate its collective expression through a systematic and orderly competition that emphasizes integrity and fairness, any resulting compilation is expected to undergo iterative enhancement in authority over time.

As a musical analogy/metaphor, a collection of competing voices without order regardless of their individual beauty is effectively noise. The beauty of music flows naturally with its rhythms and cadences. Improvisatory jam sessions analogous to wikis only work well when skilled musicians with compatible musical instruments and tastes play the same piece of music.

In a nutshell, the invention may serve as an "emperor's mirror" that reflects of the goodwill and common sense of a unified electorate while simultaneously operate as a system through which individual voters of the electorate may luxuriate in the schadenfreude of "passing judgment."

In another embodiment, the invention provides a method for altering a compilation of preexisting electronically published entries, which may be used to improve the compilation's quality. The method is typically computer implemented. The method involves subjecting each entry of a compilation of preexisting electronically published entries to replacement by successive revisions as determined by successive elections at a predetermined election frequency of an electorate of voters having access to predetermined election rules. Again, each entry may be replaced with a winning candidate revision according to a count of votes cast and a predetermined winning criterion. The winning candidate revision may later be replaced by successive winning revisions as well.

In a further embodiment, the invention provides a method for making a copy of at least a substantial portion of the compilation described above. The method involves accessing the compilation and copying at least a portion thereof, substantial or otherwise, thereby making the copy. Such copying may involve, for example, reproducing, adapting, distributing, performing, and/or publicly displaying at least a substantial portion of the entries. As a result, the copy may exhibit substantial similarity with the portion reproduced, adapted, distributed, performed, and/or publicly displayed. Notably, an adapted copy may be produced through analytical methods, e.g., data mining techniques, and may be useful in a number of contexts, e.g., as a translation guide in a semantic-web application.

In other embodiments, the invention provides systems for carrying out and/or compilations prepared using the methods described herein, adaptations and derivative works of the above, as well as copies of any of the foregoing.

Compilation, Revisions and Entries

As discussed above, the invention pertains to an election-based compilation that includes a plurality of entries subject to replacement by revisions thereof as determined by successive elections. The invention may be used for any compilation of numerous types. Exemplary compilations compatible with the invention include encyclopedias, dictionaries, thesauruses, anthologies, atlases, directories, novels, songbooks, and essays. For an encyclopedia, incumbent entries as well as candidate revisions may take, but are not limited to, the form of articles. Similarly, when a novel or an essay is provided, entries and revisions may take the form of chapters and sections, respectively. In some instances, the entries and revisions may take the form of sentences or even short phrases.

In general, any candidate revision submitted for potential replacement of an incumbent entry for a particular election must differ at least somewhat from the entry. However, the degree to which the revision differs from the entry may vary.

In some instances, for example, a revision may serve to correct obvious typographic errors and/or to improve readability of a text-based article without altering the substance of the disclosure. In the alternative, a revision may more substantially differ from the entry. In any case, it is generally desirable for a candidate revision to have at least some substantive similarities to an incumbent entry for a particular election. In some instances, such substantive similarities may be measured at least in part by automated means such as those used as compare document functions in word processing computer programs.

The format of incumbent entries may be identical to, similar to, or different from the format of any candidate revision for a particular election. For example, an incumbent entry may contain a thousand-word article that contains a single misspelled word. In some instances, a candidate revision submitted for potential replacement of the incumbent entry may take the form of another thousand-word reproduction of the entire article with the typographical error corrected. In other instances, a candidate revision may include only sufficient instructions on how to correct of the typographical error in the incumbent entry without reproducing the entire article.

In addition, compilations, entries and revisions of the invention may include one or more types of works. Exemplary types of works include: literary works; musical works, including any accompanying words; dramatic works, including any accompanying music; pantomimes and choreographic works; pictorial, graphic, and sculptural works; motion pictures and other audiovisual works; sound recordings; and architectural works. Some or all of the works may be a preexisting work or created specifically for inclusion in the compilations, entries and/or revisions of the invention. The works may be protected under copyright or may be dedicated to the public domain.

One important aspect of the invention relates to the quantity of entries of the inventive compilations. Though the invention may originate with a single incumbent entry, the inventive compilations, in general, includes at least two entries. The number of entries included in any particular compilation, however, may determine or be based on the format or nature of the compilation. For example, one measure of the comprehensiveness of a dictionary is the quantity of entries contained therein. Thus, a comprehensive dictionary may contain over five hundred thousand entries. However, an accurate compilation of biographies of U.S. presidents may include the same number of entries as the number of people who have served as U.S. presidents, which will likely number less than 50 before the year 2020. As a general rule, though, the compilations of the invention may comprise or be limited to 5, 10, 50, 100, 500, 1000, 5000, 10,000, 50,000, 100,000, 500,000, 1,000,000, 5,000,000, 10,000,000, or etc. entries. These entries may conform to the same format or may differ in format.

Quantitative criteria may also determine or be based on the format or nature of the entries. For example, each entry may comprise or be limited to a particular number of characters, syllables, words, sentences, lines, paragraphs, pixels, bits, musical notes, measures, links, pointers, etc. As discussed in detail below, such quantitative and qualitative entry formatting issues may be determined or controlled at least in part by the requirements associated with desired systemic election analysis.

While the compilation may include entries that are not subject to successive election-based revisions, at least a significant and or substantial number of entries may be subject to election-based revisions. Minimally, for compilations with a large number of entries, at least about 0.1% of all entries may be subject to election-based revisions. More typically, at least about one to about five percent of all entries may be subject to election-based revisions. Sometimes, it is preferred that an even greater percentage of entries be subject to election-based revisions. For example, it may be preferred that entries of the compilation subject to election-based revisions outnumber the entries of the compilation that are not. In such a case, the election revisable entries may represent substantially all entries of the compilation. Depending on the situation, exemplary minimum and/or maximum percentages of entries of the compilation that may be subject to election-based revisions include 10%, 20%, 25%, 33%, 50%, 67%, 75%, 90%, 90%, 95%, and 99%.

Copyright Management

As discussed above, compilations, entries and revisions of the invention may be protected under copyright or may be dedicated to the public domain. However, there is no requirement as to whether any particular compilation, entry, or revision be protected under copyright. Copyright management may vary according to the specific needs addressed by the invention. For instance, some or all entries and/or revisions of a compilation may be fully or partially protected under copyright. In the alternative, some or all entries and/or revisions may be fully dedicated to the public.

Depending on the particular copyright management system used, copyright notices may be provided in any of a number of forms. In general, the copyright notice or notices may be placed in such a manner and location as to give reasonable notice to humans or nonhumans of the claim for copyright. Notices may be used to indicate the copyright status for a compilation as a whole as well as for past/present/future incumbent entries as a whole, past/present/future/incumbent entries individually, past/present/future candidate revisions as a whole, and/or past/present/future candidate revisions individually. Placement of copyright notice may be effected in a systematic (e.g., within a dedicated space for each entry and/or revision) or an ad hoc manner.

In any case, different licensing schemes may be used with or without providing public notice thereof Divisible rights to reproduce, adapt, distribute, publicly perform, and/or publicly display the entirety or a portion of a compilation may be licensed in a manner to as to facilitate practice of the invention. For example, a copyright holder may withhold the right to allow others to copy verbatim the work contained in incumbent entry, but may allow others to adapt the work to produce a candidate revision to challenge the incumbent entry. In addition, the copyright holder may agree that certain actions taken by others constitute fair use, e.g., submitting candidate revisions. Agreements may be made between the publishers, administrators, submitters, and/the electorate regarding the copyright management of an inventive compilation or its components. Similarly, agreements may be made regarding liabilities and/or remedies for copyright infringement. Such agreements may be incorporated into the election rules.

Electorate of Voters

In general, the electorate of the invention includes a plurality of independent voters, each of whom having preelection access to the election rules. However, the electorate may vary. For example, the voters may comprise, consist essentially of, or consist of humans, associations, foundations, trusts, corporations, partnerships, limited partnerships and/or combinations thereof. Voter registration may be required for certain embodiments of the invention, though the electorate may sometimes include unregistered voters. Registration fees may sometimes be required.

In addition, depending on the nature of compilation, the electorate may have different voter eligibility requirements.

In some instances, voter eligibility may involve an upper or lower age limit. For example, the electorate of compilations of an adult nature may include humans of at least about eighteen or twenty-one years of age. Other age limits may be selected according to age limits associated legal or other generally accepted conventions. For example, upper or lower age limits may occur at 67, 65, 62, 55, 50, 40, 35, 30, 25, 17, 16, 14 and 12 years for humans.

Voter eligibility requirements may be chosen to enhance the quality, comprehensiveness, and/or reliability of the entries and/or compilation. For certain types of entries and compilations, e.g., those covering popular and/or controversial topics, the voter eligibility may serve to ensure that the electorate includes numerous voters, e.g., 1000, 10,000, 100, 000 or more voters. For example, voter eligibility may involve cost-free or no registration.

In contrast, for entries and compilations pertaining to specialized or technical matter, voter eligibility involve heightened criteria. In such a case, voter eligibility may involve educational and/or other qualifications such as professional licenses. For example, for entries pertaining to road construction techniques, the electorate may be limited to those with training in civil engineering. Similarly, for compilations pertaining to the practice of law in a particular jurisdiction, the electorate may be limited to those licensed to practice law in the jurisdiction. Testing/examinations may also serve to as a basis for voter eligibility. For example, when voter eligibility is limited to humans, a test may be given to ensure that voters have at least human-like skills. This may involve, for example, requiring a voter to retype wavy or some other human-recognizable-but-machine-confusing alphanumeric text into an entry box so as to prevent voting by automated programs. So called "CAPTCHA" (Completely Automated Public Turing test to tell Computers and Humans Apart) technologies may be used. Similarly, when an election is held between text-based revisions in English, a simple test may be given to ensure that the voter can read English. This may involve providing a short multiple-choice examination to see if a voter will make appropriate choices between acceptable and unacceptable definitions of commonly used words. For example, one of ordinary skill in the art of the English language will recognize that a "car" may be an "automobile" but may not be a "toaster."

In any case, voter eligibility may be determined by other criteria as well. For example, the electorate may be comprised of voters who are elected representatives optionally of different of geographic districts. In the alternative, the electorate may be comprised of individuals randomly selected from a population of individuals. In some instances, voter eligibility may depend on one or more of the following factors: race, gender, sexual orientation, religion, political affiliation, national origin, citizenship, economic status, heritage, club membership, etc.

As a related matter, the voting power may vary as well. In some embodiments, all voters of the electorate hold an identical voting power. That is, the electorate may consist of a single class of voters. For example, each voter may in some or all elections have one vote per election. However, votes of different voters may carry unequal weight when more than one class of voter is present. In some instances, voting power may be determined by the above-discussed factors that may be used to determine voter eligibility. For example, voting power may be proportional to registration fee paid. Veto power may be available as an exception rather than the rule.

Of significant importance is that the electorate and other users of the invention may assume a duty to uphold the integrity of the invention. For example, outright vote buying and/or selling may be prohibited, and voter independence may be encouraged or mandated. However, merely paying someone to prepare and/or submit a well-crafted revision may not by itself compromise the integrity of the invention. Similarly, political parties and vote trading mechanisms may only be established and operate in a manner that does not offend traditional notions of fair play and substantial justice. Prohibition of such parties and/or mechanisms may be appropriate in some circumstances as well.

Elections

Each entry of the inventive compilation is subject to replacement as through successive elections. The elections of the invention may be carried out in any of numerous different manners. For example, an electronically published incumbent entry may be challenged by at least one electronic candidate revision received during a submission period for the entry. An electronic election is held between any received revisions and the incumbent entry during a predetermined voting period. Electronic votes cast are counted to determine whether any candidate revision meets the winning criterion for the election. If so, the incumbent entry is replaced with the winning candidate revision, which may then serve as a new incumbent entry. Elections for different entries may typically be independently held.

The invention may, in some instance, be carried out in a manner that alters the organization of compilations. For example, an election may be held to determine whether an incumbent entry should be divided into a plurality of entries. In the alternative, an election may be held to determine whether a plurality of entries should be merged into a single entry. As another alternative, elections for related entries may be synchronized. In some instances, an election may be held to determine whether an entry should be deleted completely. An election may also be held to determine whether a new entry should be created. The winning criteria for these different types of elections may be the same or different. Such elections may serve to ensure that the compilation exists as consistent whole. Elections for different entries may be permanently or temporarily held in a dependent or independent fashion.

The elections may be carried out to ensure that due process is effected through a substantially nonhuman automated computer system to maintain the integrity of the compilation. For example, the elections may be governed by predetermined election rules, which set forth set forth at least the predetermined election frequency. Typically, the election frequency selected to allow the electorate sufficient time and/or notice to have an opportunity to review the incumbent entry, any submitted candidate entry and election rules before voting. In some instances, the election frequency may not exceed more than one election in any single continuous twenty-four hour period. Optionally, the election frequency may not exceed more than one election in any single continuous period of forty-eight hours, seventy-two hours, seven days, thirty days, one month, ninety days, three months, 180 days, one-half year, or one year. Regardless of their frequency, elections for different entries may be held concurrently or in a staggered manner, synchronously or asynchronously.

The elections may be held at different intervals as well. For example, the election periods may occur at regular cycles, e.g., every twenty-four hours, forty-eight hours, seventy-two hours, seven days, thirty days, one month, ninety days, three months, 180 days, one-half year, or one year. However, election intervals may not be regular, and election frequency may be keyed to the candidate entry submissions, timing and/or number thereof and/or the interest of the electorate. For example, an election for an entry may take place only when a voter calls for submissions and/or when a predetermined minimum number of candidate entries are submitted. In some instances, a quorum of a substantial population of the electorate may be required to call for an election and/or determine a particular election period or portion thereof. In the alternative or in addition, a measure of popularity and/or interest regarding a subject may be keyed to data from search engines. In turn, the election cycles and intervals may be determined from such a measure.

Due process considerations typically dictate election periods that provide substantially equal access to all members of the electorate. To serve a worldwide electorate, election periods occur simultaneously around the world. In the alternative, election periods may open and/or close at times keyed to the local times. However, exceptions may be made for unforeseeable circumstances, e.g., power failure, natural disasters, acts of god, etc.

Voter eligibility requirements may enhance the quality, comprehensiveness, and/or reliability of the entries and/or the compilation. For certain entries and compilations, e.g., those covering popular and/or controversial topics, voter eligibility may ensure that the electorate includes numerous voters; i.e., voter eligibility may require only free registration or even no registration. As a result, the electorate may include 3, 10, 100, 1000, 100,000 or more voters.

In contrast, for entries and compilations pertaining to specialized or technical matter, voter eligibility may involve heighten criteria. In such a case, voter eligibility may involve educational and/or other qualifications such as professional licenses. For example, for entries pertaining to road construction techniques, the electorate may be limited to civil engineers. Similarly, for compilations pertaining to the practice of law in a particular jurisdiction, the electorate may be limited to licensed attorneys. Testing/examinations may also serve to as a basis for voter eligibility.

The election rules may be enhanced through legal means as well. For example, voter eligibility may require good faith actions as a contractual obligation. Participation in bad faith, e.g., voting or submitting entries in a manner that contradicts election rules, may be discouraged through disincentives.

The election rules may also govern the submission of candidate revisions and electorate voting. In general, the submissions may be accepted only during a predetermined period for a particular election. Similarly, votes may be cast only during a predetermined voting period. Typically, the submission period occurs at least in part before the voting period, and the voting period occurs at least in part after the voting period. The submission period and the voting periods may or may not overlap. The submission and voting periods may be determined in accordance to considerations similar to those discussed above for election frequency.

Elections typically require at least one incumbent entry and at least one candidate revision. The incumbent entry may be a former candidate revision, an entry created specifically for the compilation or an entry imported from another compilation. The entries and revisions may be authored by a single author, joint authors, or a plurality of contributors. The contributors may produce entries and/or revisions in various manners. For example, the contributors may make decisions through consensus or under the authority of an editor. Optionally, an incumbent entry may be produced through collaborative writing using an open-source wiki platform to take advantage of the speed in which a "quick and dirty" entry may be created for future revisions through more deliberative and concerted efforts.

The incumbent entries and/or the candidate revisions may be submitted by any of a number of submitters. In some instances, submission may be received from anyone with access to the compilation. Alternatively, submissions may be limited to selected group of submitters. Voter eligibility criteria may be identical in whole or in part to submitter eligibility. Election interval factors may be considered in whole or part to determine the submission period.

The invention may include a means for receiving at least one electronic candidate revision for each entry during a predetermined submission period. The receiving means may incorporate known receiving technologies. In some instances, the receiving means may include web-based technologies associated with electronic payments. For example, the receiving means may allow a submitter to check for mistakes and to make corrections before taking irrevocable action, e.g., submit a candidate revision as an official election entrant. When the revision is a text-based work, spelling/grammar checkers known in the art may be used. In addition, the receiving means may allow a submitter to save drafts of a revision before submission. Furthermore, a plurality of contributors may work on a revision before submission. In such a case, the approval of a subset or the entirety of the contributors may be required before submission. Similarly, a submitter may allow co-submitters to work on a candidate revision only upon invitation. Optionally, a maximum number of candidate revisions may be imposed for a single submitter for a particular election.

Once received, entries and/or revisions may be put forth for election or be rejected according to election rules. Typically, the revisions may be presented for electorate in a manner that allows for facile comparison of the incumbent entry and the revisions. For example, portions of text-based entries and revisions that differ may be highlighted in different colors. As another example, underlining may indicate insertion while strikethrough may indicate deletion. In any case, the entries and/or revisions may be presented in a manner that unfairly favors any one over the other(s). For example, the order of entry presentation may be randomized.

In some instances, entries and/or revisions may be instantaneously accessible to the electorate once submitted. However, there may be a delay in other instances. For example, a delay may be helpful to ensure that the submission conforms to an appropriate format, length, and/or other predetermined criteria. In addition, the submission may be reviewed to ensure that it does not contain matter harmful to the compilation in any form, e.g., viruses, worms, pirated material, libelous material, etc. Typically, harmful submissions may be removed or omitted from election eligibility.

Optionally, a campaign period may be imposed to allow for the submission and publication of campaign materials so as to inform the electorate and/or to influence votes. Such campaign periods may occur no earlier than the opening of the revision submission period and no later than the closing of the voting period. For example, campaign material may be published after the close of the entry submission period to compare and/or contrast the merits of the incumbent entries relative to the merits of any submitted revisions. As another example, the campaign materials may compare the qualifications of the submitters. In any case, entry submitters may be allowed an opportunity to make an official statement regarding their entries. Campaign-materials receiving means may serve numerous functions, e.g., make the campaign material available in an organized fashion, ensure that campaign materials comport with campaign rules, provide a real-time forum for discussion, etc. Respectful and courteous campaigning may be encouraged.

During the voting period, voters may cast votes according to election rules. Voting systems may vary. In some instances, each voter of the electorate may submit a single vote for any single election. In the alternative, multiple votes may be cast to allow the voter to vote for and/or against any subset of the alternatives. In some instances, ranked or range voting may be used. Optionally, a voter may express an indication of for no preference.

In any case, the predetermined winning criterion may depend on the voting system used. For certain voting systems, the entry with the most number of votes may win. A majority of votes may be required in some instances. Sometimes, a predetermined tiebreaker criterion may be required for certain voting systems. Runoff elections, instant or otherwise, may take place. Similarly, primaries may take place in which political parties may endorse one or more entries or revisions. In some instances, a supermajority, e.g., a count of at least 55%, 60%, 66%, 75% or more, of the votes cast during the voting period may be required in order to replace an incumbent entry with a winning candidate entry. Optionally, a quorum of eligible voters is required as a part of the winning criterion.

A count or tally of the votes cast is taken and evaluated against the predetermined winning criterion. A winning candidate revision may automatically replace the losing incumbent entry. Otherwise, the incumbent entry remains and may be subject to future elections. Optionally, incumbent entries may have term limits. Incumbent entries may be limited to one, two, three, four, five, ten, or more terms.

There may be a plurality of winners if the election rules so provide. For example, an incumbent entry may take the form of a text-based article that contains two different typographical errors. Two different candidate revisions may each correct only some of the errors that are not corrected by the other candidate revision. The voters may decide that both candidate revisions may be winners. In such a case, a new incumbent entry may result that contains the contributions of both candidate revisions, since the candidate revisions do not conflict.

Publisher/Election Administrator

Different entities may serve as a publisher of the inventive compilation. In general, existing publishing entities may practice the invention to revise existing works. For example, a publisher of an existing traditional encyclopedia may submit its own existing material as initial incumbent entries. In addition, the publisher may either carry out the administration of the elections itself, or allow a separate entity to administer the elections. Administration may be carried out or supplemented using automated and/or nonhuman means.

An administrator, human or nonhuman, may function in a transparent way to maintain the integrity of the elections of the invention, to enhance the overall quality of the compilation, and to prevent harm to the compilation. This may be done by any of a number of organizations. Exemplary organizations that may serve as an election administrator and/or publisher include for-profit or not-for-profit organizations, professional associations, fraternal organizations, trade groups, cooperatives, academic societies, labor unions, political action committees and parties, and corporate entities. Each of these organizations comes with its own advantages. For example, publicly traded for-profit corporations may be created and operated in a manner that aligns profit motives with compilation integrity. In addition, as such corporations are subject to certain disclosure requirements, such requirements may additionally serve as a means for ensuring compilation integrity. Similarly, nonprofit corporations may exploit the benefits associated with volunteerism and philanthropy. The articles of incorporation of such entities may further ensure compilation integrity.

In general, the administrator may act only in accordance with rules and procedure that in a manner that promotes the integrity of the compilation in an inclusive manner. Such rules and procedures may be accessible to substantially all persons and entities associated with the compilation to provide sufficient notice as to how the administrator must act for any given circumstance. Optionally, the administrator who does not have the authority to alter such rules and procedures may offer suggestions for amendments that may promote administrative efficiency.

A means may be provided to allow all associated with the invention to provide feedback regarding the performance of administrator. For example, when the administrator takes action to the disliking of one or more voters of electorate, e.g., remove allegedly defamatory material from the compilation, a means may be provided to allow the voters to provide comments as to why the material is not defamatory and to petition for the restoration of the material. Optionally, the actions of the administrator may be appealed to a higher authority, e.g., the administrator's supervisor, or, in some instances, the electorate itself, via election.

Systemic Integrity and Modifications

Generally, systemic integrity may be tantamount to compilation authority. As a safeguard against arbitrary and capricious action, the compilation may include due process and fundamental fairness safeguards. For example, the compilation may be administered in accordance with written, publicly disclosed rules.

In addition, the compilation's authority may be derived from the consent of the submitters, the electorate, and/or the audience. A principal mechanism for translating that consent into compilation's' authority is the holding of fair elections with proper advance notice to all involved. Fair elections are not merely symbolic and should be competitive, periodic, inclusive, and definitive. Great care should be taken to prevent any explicit or hidden structural bias aside from those beneficial biases that naturally result from an electorate that has equal and ample access to information about the compilation and its elections. Automated or manual notification may be triggered according to electorate or individual voter desires. For example, an individual voter may elect to be notified of upcoming elections for specific entries. Such notifications may employ email and/or real simple syndication (RSS) technologies. Similarly, an election administrator and/or publisher may suggest elections that may be interest to certain voters according to survey information and/or voter activities. To be avoided are sham process that appears to be a genuine electoral contest, in order to present the facade of popular consent and support.

The compilation may also have an easily accessible means to allow the submitters, the electorate, and/or the audience to publish their criticism and to present alternatives. Such means may, for example, allow the compilation to receiving candidate revisions and/or campaign materials. When receipt of submissions is limited to selected group of submitters, others may be allowed to contact the members of the select group so that the member may submit on behalf of others. Such means typically operate in an open manner that comports to election rules.

On occasion, the compilation may be subject to attack by harmful matter taking any of a number of forms. Accordingly, the integrity of the compilation may be enhanced through means to eliminate or neutralize such harmful matter. For example, known technologies such as antivirus, anti-intrusion and electronic security software may protect the compilation against harmful technologies. Human or nonhuman intervention may serve to ensure that compilation and entries of the invention comport to all applicable laws, e.g., keep the compilation and entries of the invention free from pirated material (e.g., copyrighted material used unfairly without the copyright holder's permission, materials that violate a person's right of privacy or publicity), threats of imminent bodily harm, and obscene and/or defamatory material. Patently false information may be removed even if the information may not be legally actionable.

It should be noted that some materials are harmful in some but not all contexts. For example, material protected under the laws of the United States may not be protected under the laws of China. In such a case, different members of a worldwide audience may be allowed access to the compilation or portions thereof according to local laws. Nevertheless, selective access or other harm reducing means may carry out its functions in a narrowly tailored manner to minimize censorship of the compilation and alienation of the electorate and/or the audience. In addition, any action taken to remove harmful material may be proportional to the harm associated with the material. For example, when a person objects to a small section an entry that contains false but not legally actionable material, the section may be highlighted and identified as such but not removed. However, an entire entry having a portion that contains a harmful fast-spreading virus may be removed immediately to prevent spread of infection.

Similarly, any action taken to punish a user or deter future bad acts may be proportional to the culpability of the user. For example, a repeat submitter of harmful materials may be banned temporarily or permanently from submitting additional materials. In addition, actual or constructive malice on the part of a user may be required to punish the user for past bad acts and/or deter future bad acts. For example, a submitter may be punished for submitting false entries purporting to contain entirely truthful information if the submitter acted with reckless disregard of the truth. Similarly, a voter may be prevented from future votes if the voter is found to have engaged in actual or attempted vote selling. Furthermore, an advertiser may be banned from advertising with the compilation if it has been found to have engaged in actual or attempted vote buying activities.

In any case, any changes in rules may generally occur only infrequently relative to the frequency of elections. For example, the changes in rules may occur at a frequency that is at least about an order of magnitude lower than the frequency of elections. For example, when incumbent entries are subject to revision by elections at an election frequency of no more than once per month, the election rule governing the elections may be subject to substantive revision no more than about once in any single continuous year-long period. Under rare and exceptional circumstances should the election rules substantially change mid election in an apparent or actual outcome-determinative manner. Such rare and exceptional circumstances may involve imminent and substantial harm to the compilation.

While any rule changes may require the consent of the publisher, changes in rules may occur according to the wishes of the electorate as well. For example, the election rules may be modified in a manner similar to that associated with the entries of the compilation. However, the criteria for modifying the election rules may generally be more strict or rigid than the criteria for revising an entry. For example, when the election rules indicate that a majority of votes cast determines whether the incumbent entry or any candidate revisions represent the winning entry, a supermajority of the electorate votes cast may be required to revise the election rules. Optionally, a quorum of all eligible voters may be required to revise the election rules.

Election Rules, History, and Results as a Measure of Entry Quality

In general, election rules, history, dates and times, total number of eligible voters, voter eligibility, number of abstentions and/or votes cast, and election results that precede, immediately or otherwise, the replacement of an incumbent entry with a winning candidate revision may provide a qualitative and/or qualitative measure of various attributes of the winning revision. For example, the total number of votes cast for a particular election provides an indication of the popularity of the entry at the time of the election. A high frequency of elections may indicate that the entry is one that covers a subject prone to rapid evolution. A close election may indicate that the entry may contain controversial materials with which a substantial number of minority voters may not entirely agree. Statistical techniques may be employed when quantitative measures are provided. For example, an entry on which a large number of different voters of have cast votes over time may generally be more authoritative than an entry on which only a relative few different voters have cast votes. Similarly, an incumbent entry that has survived many election cycles may generally be more authoritative than one that has not. Aggregate and/or statistical information regarding voter characteristics, e.g., education level, age, etc., may further provide a measure of entry quality In short, an important aspect of the invention is that it provides the measure of authority or authoritativeness regardless whether it provides a measure of relevance. Such measures may be provided in one or more user-friendly form, e.g., as an overall authoritative index that aggregates all relevant statistical measures optionally in an appropriately weighted manner.

All materials associated with the elections may be archived in a manner that allows for facile historical analysis for any election. With a good archive system, a previously losing entry or revision may be brought back and optionally modified for a subsequent vote. This can be done, for example, when a historian uncovers a previously submitted losing entry or revision that was too far ahead of its time for the electorate to recognize its nature. Archival activities may be carried out in a manner that avoids any an actually and/or appearance of an attempt to rewrite history.

Systemic Election Analysis

The invention also provides a way in which human "common sense" may be quantified/manipulated/analyzed using a rigorous and systematic method, e.g., through known mathematical, statistical, pattern recognition, informatics, set theory, and/or data mining methods, rather by an ad hoc, e.g., "I know it when I see it," approach. For example, information relating to election rules, election results, election histories, entry content, subentry content, subentry content changes, submitters, voters, audience, and/or relationships therebetween may be analyzed and/or manipulated by a human or nonhuman means (e.g., hardware and/or software) in a manner to provide insight as to how common sense may be defined in view of the invention. Such insight may be used to improve the performance of search engines and other technologies. With proper design and implementation, an embodiment of the inventive compilation may ultimately be viewed as a translation guide/dictionary between collective human intent and machine-readable expression. Such a translation guide/dictionary may serve as a "Rosetta Stone" of a "semantic web."

To illustrate how historical analysis may be carried out in the context of the invention, the following example is provided. In the example, an entry, E, of a compilation includes one or more subentries, S. Initially, an initial incumbent entry, E0, may be provided comprising an initial subentry S0. Successive elections are held. When a first election is held, a candidate revision E1 comprising subentries S0 and S1 successfully challenges the original incumbent entry E0. As a result, E1 replaces E0 and serves as the new incumbent entry. In a second election, candidate revision E2 that includes subentries S0, S1, S2, and S3 successfully challenges E1. In a third election, candidate revision E3 that includes subentries S0, S1, and S2 but that excludes S3 successfully challenges E2. In a fourth election, candidate revision E4 that includes subentries S0, S1, S2 and S4 loses to E3. As a result, E3 remains the incumbent entry. In a fifth election, candidate revision E5 that includes subentries, S1 and S2 but that excludes subentry S0 loses to E3. As a result, E3 again remains the incumbent entry.

From the above example, it may be inferred E3 is more authoritative than either E4 or E2, since E3 won head-to-head competitions against each of E4 and E2. Similarly, it may also be inferred E2 is more authoritative than E1, and E1 is more authoritative than E0. If the subentries are independent from each other (e.g., the authority of any entry is a sum of the authority of its subentries), it may also be inferred that the presence of S0, S1 and S2 tend to render E more authoritative and that the presence of S3 or S4 tends to render E less authoritative. It may be further inferred that the presence of S2 may be a stronger influence on the authoritativeness of E than the presence of S3. In any case, the degree of certainty relating to such inferences may be determined at least in part from vote tallies, timing, and other attributes/results of the elections.

To continue the above example, a sixth election is held in which E6, comprising subentries S0, S1, S5, successfully challenges E3, which as discussed above includes S0, S1, and S2, during close election. Immediately thereafter, a seventh election is held in which E3 is submitted as a candidate revision to E6. This time E3 wins in a close election. In an eighth election, E7, comprising S0, S1, S2, S5, unsuccessful challenges E3. In a ninth election, E8, comprising S0, S1, S2, S5, and S6, successfully challenges E3.

From the above, it can be inferred that the presence of S2 and S5 have comparable influence on the authoritativeness of E. It may also be inferred that S2 and S5 are related to but incompatible with each other in the absence of S6 in the context of E. Thus, S6 may be inferred to neutralize the excessive duplicative effect of the combination of S2 and S5, to render S2 and S5 compatible/complete. It may also be inferred that the submitter of E8 has shared a particularly valuable insight regarding the relationship between S2, S5 and S6 in the context of E.

As alluded to above, the format of the invention dictate how election analysis may be carried out. For instance, it may be noted from the above example, S0 is different from other subentries because it is the sole subentry that is present in all incumbent entries. As described above, S0 may represent a de facto identifier of E. However, with a slight variation of the above example, S0 may serve as a unique identifier of E that is more de jure in nature. In some instances, S0 may be may originate as a de facto identifier of E, but later gain status as a quasi de jure identifier of E in a manner similar to how trademarks gain in strength through use. In such a case, S0 may at some point be treated as "famous." In the alternative, S0 may serve as a de jure identifier of or be synonymous with E in a manner similar to how generic terms operate in society.

Thus, those of ordinary skill in the art will recognize that known database design and implementation principles may be used with the invention. For example, the invention, in an embodiment, may include a plurality of entries of identical or substantially identical format. Each entry may consist of a plurality of elemental subentries, the subentry plurality comprising a unique or de jure computer-recognizable identifier, a quasi de jure or human-recognizable identifier, and one or more ordinary subentries. In such a case, a computer-recognizable identifier elemental subentry may not be not be subject to revision by election, the one or more ordinary subentries would be subject to replacement through a successful election under an ordinary replacement criterion, and the human-recognizable identifier elemental subentry would be subject to replacement through a successful election under a identifier replacement criterion that is more stringent than the ordinary subentry replacement criterion.

While the above discussion provides an example of a particular analytical technique and system that may be used with the invention, other techniques and systems may be used as well. Such techniques, for example, may be employed on a subentry, entry and/or compilation basis. Insight from analysis may be used improve compilation authority by humans and/or nonhumans. For web-based and other embodiments of the invention, such insight may serve to promote the progress of science and useful arts wherever humans may go.

The analytical techniques may be adapted for personal use and understanding in view of privacy considerations. For example, by selectively analyzing the contributions of a particular user, e.g., submissions, votes, entries accessed, etc., and optionally viewing how such analysis relates to the contributions other users with similar contribution and/or the compilation as a whole, one may gain inside into that user's view of authority. Thus, customized tools may be created based on the results of such analysis. Preferably, a tool maker should seek a user's consent before tracking such targeted and individualized information. However, ratification after the fact may serve as a substitute in some instances for prior consent.

Compatibility with Existing Publications and Technologies

The invention is compatible with a variety of publications and existing technologies. For example, a compilation may be published in conjunction with an internet search engine or other websites. In addition, the invention may be used in conjunction with existing electronic compilations such online encyclopedias, classified, personals, etc. Furthermore, a compilation may be published with advertisements in the form of links, pop ups, etc. Optionally, advertisements, e.g., sponsored links, accompanying an entry may be priced at rates keyed to quantitative and/or qualitative measures and attributes of the entry of than the traffic generated by or the size of the entry's audience.

Optimally, the invention may be employed in conjunction with existing internet-based communities, compilations, and technologies. Exemplary technologies compatible with the invention include those affiliated with various websites, e.g., auctions sites such as at ebay.com, free email services such as gmail.com, yahoo.com, and hotmail.com, shopping mall sites such as amazon.com, broadcasting services such as youtube.com, and personal connection services such as friendster.com and myspace.com. Search engines such as those associated with google.com may particularly benefit from the invention.

For example, software for search engines may include an adaptation of a substantial portion of a compilation of the invention, e.g., 1%, 5%, 10%, 25%, 33%, 50%, 60%, 67%, or more of the number of entries and/or election histories thereof. Similarly, only portions of each entry that form a compilation may be used as well. For example, the adaptation may include 1%, 5%, 10%, 25%, 33%, 50%, 60%, 67% or more of each entry. A substantial portion of a compilation of the invention may be qualitatively described as well. For example, each entry of a compilation of the invention may include a plurality of subentries of different types, e.g., identifier, text, links, and historical election data. An adaptation may include only identifier, links and historical election data.

When the invention is used in combination with other publications and technologies, the combination may be implemented without losing sight of the integrity of the invention. Thus, for example, when a publisher publishes a work that includes the inventive compilation with advertisements, the work may be published in a manner that clearly indicates that the contents of the compilation are not influenced or affected by the presence or absence of advertisements. In the case of internet-based embodiments of the invention, the entries of a compilation of the invention may be separated from advertisements. For example, the entries may be provided as web pages that are linked to one another without being linked to any web pages that do not from a part of the compilation. When links to outside web pages, e.g., advertising links, are included as a part of the inventive compilation, a user of the compilation, after clicking on such a link, may be warned, e.g., via a popup warning, that he or she may be leaving the compilation, before being redirected to the outside web pages.

Submitter, Voter, and Audience Participation Incentive

In general, it is preferred that the invention be open to a large number of willing participants. To encourage participation, positive incentives may be provided to reward desirable activity. Desirable activity may include, submitting an incumbent entry, submitting a winning incumbent entry, submitting a candidate entry, submitting a winning candidate entry, registering as a voter, voting, voting in an informed manner, voting for a winning entry, campaigning, campaigning for a winning entry.

Rewards may be proportional to the desirability, effort needed to carry out, and/or demand of the activity. For example, when it takes more effort to submit a candidate revision than it takes to vote, a greater reward may be provided for submitting a revision than for voting. Similarly, because it is typically more difficult for a revision to win an election in which many rather than a few candidate revisions are submitted, a greater reward may accompany a win in an election in which many candidate revisions are submitted than a win in an election in which only one candidate revision is submitted. Furthermore, since informed votes are typically more desirable than uninformed votes, a greater reward may be provided for votes submitted after a review of all relevant election information, e.g., the incumbent entry, all candidate revisions, and all campaign materials, than for votes submitted without review of all relevant election information.

Incentives may take any of a number of forms. For example, incentives may involve a rating system that publicly acknowledges the number of positive actions made by a participant relative to the number of negative actions. In some instances, a voter with a higher rating may enjoy a stronger voting power than a voter with a lower rating, though any differences in voting power must comport with the principles of fundamental fairness and due process to preserve the integrity of the compilation. As another example, money or other items of value may be used as rewards. Money and quantitative rewards are sometimes preferred over qualitative rewards for addressing issues of worth and proportionality.

Thus, in some embodiments, points may be used as a quantitative incentive. Such points may be redeemed for services, goods, and/or discounts provided by advertisers, the publisher, and others. For example, such points may be redeemed for advertising space and/or preferred/exclusive advertising placement. As another example, such points may be redeemed for transactional costs associated with a publisher's auction website. In some instances, such points may represent an opportunity to win a prize in a lottery.

Reward points and other quantitative incentives may be determined by election results. For example, reward points may be conferred to a submitter of a winning entry for an election in a number proportional to all votes cast. As another example, reward points may be granted to each entry submitter in numbers proportional to votes cast for each entry.

The incentives and/or rewards may or may not be transferable between members of the electorate. Similarly, the incentives and/or rewards may or may not be transferable between a member and a nonmember of the electorate. Such transfer issues may vary depending on the particulars needs and/or desires of the publisher, audience, electorate, etc. In some instances, a tax or a surcharge may be imposed for transfers.

In short, one may think of reward points as the currency (e.g., cash or money) of the invention. For example, it is takes more effort by an electorate to compare and contrast incumbent entries with many candidate revisions in a crowded election than in an uncrowded election with only a single candidate revision. To discourage election crowding, increasing points may be required as entry fees to later-submitted candidate revisions. In addition, a points-banking system may be set up to reward those who delay redeeming their points through interest payments.

Identity Versus Anonymity

Depending on the nature of the compilation, it may or may not be desirable to publicize the identity of persons and other entities associated with the compilation, e.g., contributors, submitters, electorate, audience, and/or publisher. For example, a submitter of a candidate revision may wish to be identifiable to allow voters to inspect his or her credentials as part of his or her campaign to replace an incumbent entry. In contrast, a voter may wish to remain anonymous to preserve his or her privacy while expressing his or her views. Thus, any person or entity associated with the inventive compilation may be anonymous, identifiable, or somewhere in between, depending on circumstances.

For example, voters may submit personal information about themselves in order to qualify to vote for an entry. Such information may include: age, education level, years of experience in a particular field, licenses, address, etc. Such information may serve to assist in statistical analysis of election results so as to provide a measure of entry authority and reliability. When such information is provided, care may be taken to ensure that such information is used solely to enhance the authoritativeness and integrity of the compilation. Positive incentives may be awarded to those willing to provide such personal information. Negative incentives may be imposed on those who knowingly or willfully provide false personal information or engage in identity theft. Such information may be collectively analyzed to determine the authority or authoritativeness of an entry or compilation, regardless whether such information is pertinent to voter eligibility.

In instances where verifiable identification is required, various technologies known in the art may be used. For example, credit cards, phone numbers, social security numbers, national identify codes, email address and other information may be used to verify the identify of any person or entity associated with the invention. Optionally, cryptographic schemes and methods, e.g., PGP (pretty good protection) encryption techniques involving large prime numbers, may be used as well to verify the identity of the person or entity while providing a certain degree of privacy. Legally enforceable protections schemes may provided as well.

Privacy protection measures should be effective to ensure that any information provided by persons and other entities associated with the compilation cannot easily be used against such persons and other entities than in a manner that comports with traditional notions of fair play and substantial justice. For example, the compilation may not provide information in a manner that facilitates identity theft, harassment and/or annoyance. However, aggregate information regarding persons and other entities associated with the invention in a manner that does not allow for individual targeting.

Target Audience

The invention also accounts for instances where different audiences have different needs and comprehension levels. Different entries may be provided covering the substantially the same material but for different audiences. Such entries may be associated with different voter eligibilities selected according to audience needs.

For example, an entry written for a highly educated specialist on a topic covering the specialist's field of expertise may include terminology that intimidates an audience of ordinary general education. While such an entry may represent be a winner for an audience of the specialist's peers, such an entry may not win over a target audience desiring general education. In such a case, the specialist may submit a simplified candidate revision that covers the topic in language that is more accessible to the target audience for election by an electorate of the target audience. Both entries may be included in the same compilation. In such a case, the voter eligibility may be used as a way to communicate to the audience which entry may be more appropriate to audience needs.

Other means for identifying the target audience may be provided as well. For example, election results may be used to provide submitters feedback regarding whether any entry is appropriately written for a target audience.

Electronic Democracy

The invention may also be useful in the context electronic democracy, e.g., cyberdemocracy. In particular, the invention may be used to facilitate various previously unknown forms of direct democracy. Direct democracy generally lodges sovereignty in the assembly of all citizens who choose to participate. Unlike representative democracy, which is founded on the exercise of popular sovereignty by the people's elected representatives acting in the people's interests, not as their proxies, direct democracy allows citizens to enact laws themselves.

For example, the invention may serve as a basis for a legislative branch of a government similar the United States federal government. The laws may be provided in the form of the inventive compilation. In effect, the electorate serves as the legislature and writes the laws in the form of entries of a compilation via elections. The laws may be executed by the executive branch of the government, headed by a president, and interpreted by the judicial branch of the government, comprised of individual and panels of judges. The president may be elected by the electorate to serve a number of terms, with or without limitation, by majority vote, subject to removal only by impeachment by the electorate by a supermajority vote. The judges may be appointed for life by the president with the advice and consent of a majority of the electorate and may be subject to removal only by impeachment by the electorate by supermajority vote.

From the above example, it should be evident that the invention may be adapted to approximate electronically any known election-based forms of government and law making regardless whether they are considered direct or representative democracies in part or in whole.

Electronic Communities, Interaction with Others, and Ownership

The invention may be used by different electorate communities to allow their collective voice to be heard and optionally commented upon by others. For example, a scientific association may use the invention to revise and/or refine entries relating to the association's expertise through successive votes by its members. In some instances, such entries may involve a subject matter that is of interest to the public at large, e.g., whether Pluto is a planet. Accordingly, the scientific association may wish to provide the general public with a way to express their opinion regarding their entries to ensure that the scientific association's viewpoint remains credible and well accepted by the general public. In such a case, those not of the association may be allowed to vote in an advisory capacity and to engage in campaigning activities so as to provide the association with quantitative and/or qualitative feedback regarding the association's collective efforts.

Similarly, the invention may be used to produce a single comprehensive compilation that accounts for the viewpoint of a plurality of electorates. For example, a publisher of such a comprehensive compilation may delegate the administration and rule making functions for a subset of the compilation to a particular professional organization take advantage of the professional organization's expertise. Those not of the professional organization may be allowed to vote in an advisory capacity and/or engage in campaigning activities so as to provide the association with quantitative and/or qualitative feedback regarding the association's collective efforts.

In some instances, established organizations that licenses and/or collects royalties for intellectual property may use the invention as a way to generate interest and/or "buzz" for its properties. For example, musicians often enjoy improvising, rearranging, adapting and otherwise making a preexisting work "their own." The invention may be used to provide a forum to allow musicians to engage in and to share in profits and/or ownership rights for such activities with copyrighted and/or public works through successive competitions, optionally in different categories, e.g., pop, jazz, classical, hip hop, salsa, vocal, instrumental, etc.

Advertising

The invention also recognizes the synergies possible with compilation authority, economics, and advertising. Often, consumers may wish to educate themselves regarding topics relating to products and/or services of interest. The invention provides a previously unknown way to provide choice to consumers by allowing the consumers to view the choices with the guidance of an authoritative viewpoint. That is, the consumer can benefit from the collective deliberative viewpoint of the electorate instead of having to sort through a search-engine generated listing of sites of undetermined authority and motive.

For example, a first-time purchaser of a fixer-upper home may have a generalized desire to improve the home. The new homeowner may be cash poor and too busy trying to make money to pay for the new home and taking care of family needs than to research the matter in a time-wasting or inefficient manner. Furthermore, the inexperience homeowner may be at a loss as to how to start, but is mindful that unethical persons typically find it easier to mistreat or take advantage of inexperienced consumers.

While the new homeowner may attempt to start by researching the matter via search engine, the search engine approach may not be entirely satisfactory for a number of reasons. For example, the new homeowner may not know precisely what he or she should look for. Accordingly, the new homeowner may include overbroad search terms. As a result, the new homeowner may be overwhelmed by number of hits from commercial sites whose primary purpose is to sell their products and/or services instead of educating the consumer via an authoritative tutorial.

In contrast, in order for an entry of the invention to maintain its status as an incumbent, the entry must have met at least a winning criterion. The homeowner may do his or her homework by reading an entry that contains a tutorial on home improvement before spending hard-earned cash on unnecessary products or services. In short, the invention allows users to "stand on the shoulder of giants" by educating themselves in a manner that leverages the success of the winning entries. Once such education has taken place, the homeowner may proceed by clicking on a conveniently located sponsored link contained in the compilation or do more research using a search engine.

Advertising published with the inventive compilation may be contextually relevant and unobtrusive. Advertisement placement may serve to help rather than inundate users. By way of a classroom analogy, one may view entries of the invention as "required reading" whereas the advertisements represent "optional" extra credit assignments.

Thus, the invention provides a number of substantial improvements to known technologies pertaining to existing electronic compilations. While not wishing to be bound by theory, it is believed that the fundamentally fair and democratic nature of the invention coupled with collective participant good will and the deliberative efforts of a consenting electorate as whole will, among other things, ultimately yield a timely, comprehensive, accurate, reliable and authoritative reference work available to anyone having access to the internet. The invention seeks to bring to every single person free access to the product (not sum) of all human knowledge. It is hoped that the invention in its various forms will allow collective human knowledge to boldly go where no one has gone before (FIG. 1).

Variations of the present invention will be apparent to those of ordinary skill in the art in view of the disclosure contained herein. For example, while the invention has been generally described in the context of compilations with text-based entries, the invention may be used with compilations that include entries that are not text-based. In some instance, the entries may be modules or objects of collectively authored computer programs. In addition, known tools, e.g., Microsoft® FrontPage as well as developer hardware and software may be adapted for used with the invention to allow for easy setup and/or modification of compilations of the invention. Furthermore, specialized tools and modules, e.g., in the form of software, computer programs, or circuitry, may be developed to allow programmers and administrators to set up compilations in accordance with the invention. Variations of the present invention may also be apparent in view of various resources pertaining to lawmaking and intellectual property law, e.g., Titles 1, 2, 15, 17 and 35 of the United States Code.

In any case, it should be noted that any particular embodiment of the invention may be modified to include or exclude features of other embodiments as appropriate without departing from the spirit of the invention. It is also believed that principles such as "economies of scale" and "network effects" are applicable to the invention and that synergies arising from the invention's novelty and nonobviousness increase with when the invention is practiced with increasing numbers of entries, revisions, elections, submitters, voters, other users, and/or the like. Appropriate usage of computerized and/or communication means, e.g., web-based hardware and/or software, cellular and land-based telephonic equipment, and antenna-based, satellite and cable television technologies, allow for further synergies.

It is to be understood that, while the invention has been described in conjunction with the preferred specific embodiments thereof, the foregoing description merely illustrates and does not limit the scope of the invention. Numerous alternatives and equivalents exist which do not depart from the invention set forth above. Other aspects, advantages, and modifications within the scope of the invention will be apparent to those skilled in the art to which the invention pertains.

All patents, patent applications, and publications mentioned herein are hereby incorporated by reference in their entireties to the fullest extent not inconsistent with the description set forth above.

I claim:

1. An election-based electronic compilation, comprising:

a plurality of electronically published incumbent entries, wherein each entry is subject to replacement as determined by successive elections of an electorate of voters having preelection access to predetermined election rules;

a preelection-access means for providing the electorate of voters preelection access to the predetermined election rules, the preelection-access means serving to ensure prior electorate consent before participation in one or more of the successive elections;

a means for receiving at least one electronic candidate revision for each entry during a predetermined submission period for each entry;

a means for putting forth the at least one candidate revision received during the predetermined submission for electronic voting by the electorate during a predetermined voting period;

a means for counting electronic votes cast by the electorate during the predetermined voting period; and a means for electronically replacing any losing incumbent entry with a winning candidate revision determined according to a count of votes cast and a predetermined winning criterion, wherein the predetermined election rules set forth at least the predetermined election frequency, the predetermined submission period, the predetermined voting period, and the predetermined winning criterion, and the successive elections are held at a predetermined election frequency selected to allow the electorate sufficient time to have an opportunity to review the incumbent entry, any submitted candidate entry and election rules before voting.

2. The compilation of claim 1, further comprising a means for receiving campaign materials pertaining to the incumbent entries and/or candidate electronic revisions during a predetermined campaign period, wherein the campaign period occurs at least in part before the voting period and at least in part after the submission period.

3. The compilation of claim 1, wherein each incumbent entry is published with information pertaining its history.

4. The compilation of claim 3, wherein each entry's history information comprises a tally of votes cast for and against the entry and election rules associated with the entry's election.

5. The compilation of claim 1, wherein the compilation comprises an internet-based reference selected from the group consisting of encyclopedias, dictionaries, thesauruses, and combinations thereof.

6. The compilation of claim 1, wherein the electorate comprises humans.

7. The compilation of claim 6, wherein electorate consists essentially of humans as screened by automated testing.

8. The compilation of claim 6, wherein the electorate includes at least 1000 registered voters.

9. The compilation of claim 8, wherein the electorate includes at least 100,000 registered voters.

10. The compilation of claim 1, wherein each voter has an identical voting power.

11. The compilation of claim 10, wherein no election for any entry is held more than once in any continuous 24 hour period.

12. The compilation of claim 10, further comprising paid advertisements.

13. The compilation of claim 10, further comprising a means for rewarding the voters for voting.

14. The compilation of claim 10, further comprising a mean for rewarding a submitter for submitting a candidate revision.

15. The compilation of claim 10, further comprising a means for rewarding a submitter for submitting a winning candidate revision.

16. The compilation of claim 10, further comprising a means for removing harmful material.

17. An electronic adaptation prepared by a process comprising:

(a) accessing an election-based electronic compilation comprising a plurality of electronically published incumbent entries, wherein each entry is subject to replacement as determined by successive elections of an electorate of voters having preelection access to predetermined election rules, a prelection-access means for providing the electorate of voters preelection access to the predetermined election rules, the preelection-access means serving to ensure prior electorate consent before participation in one or more of the successive elections, a means for receiving at least one electronic candidate revision for each entry during a predetermined submission period for each entry, a means for putting forth the at least one candidate revision received during the predetermined submission for electronic voting by the electorate during a predetermined voting period, a means for counting electronic votes cast by the electorate during the predetermined voting period, and a means for electronically replacing any losing incumbent entry with a winning candidate revision determined according to a count of votes cast and a predetermined winning criterion, wherein the predetermined election rules set forth at least the predetermined election frequency, the predetermined submission period, the predetermined voting period, and the predetermined winning criterion, and the successive elections are held at a predetermined election frequency selected to allow the electorate sufficient time to have an opportunity to review the incumbent entry, any submitted candidate entry and election rules before voting; and (b) including in the electronic adaptation at least a portion of each of the plurality of electronically published incumbent entries of the compilation, and information pertaining to each entry's history.

18. The adaptation of claim 17, comprising software.

19. The adaptation of claim 18, comprising a search engine.

20. The compilation of claim 1, where the preelection access means further provides any submitter of any electronic candidate revision preelection access to the predetermined election rules to ensure prior submitter consent before participation in one or more of the successive elections.

* * * * *